May 12, 1964  A. BRUDNAK, JR., ETAL  3,132,699
SAFETY RELEASE AND SWITCH OUT MECHANISM FOR HYDRAULIC SYSTEM
Filed Nov. 1, 1961  3 Sheets-Sheet 1
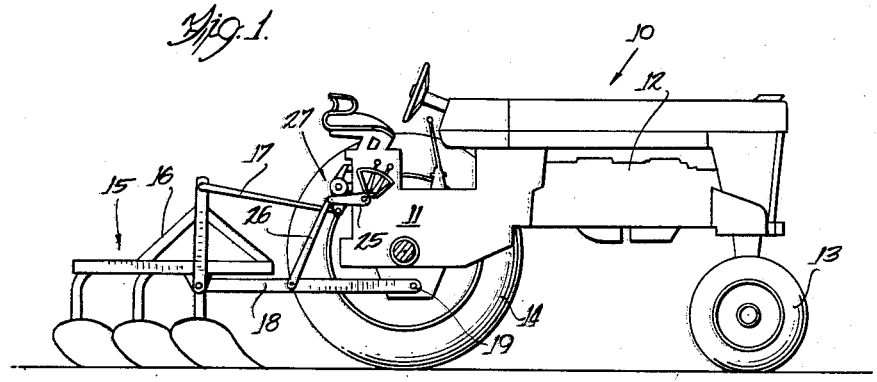
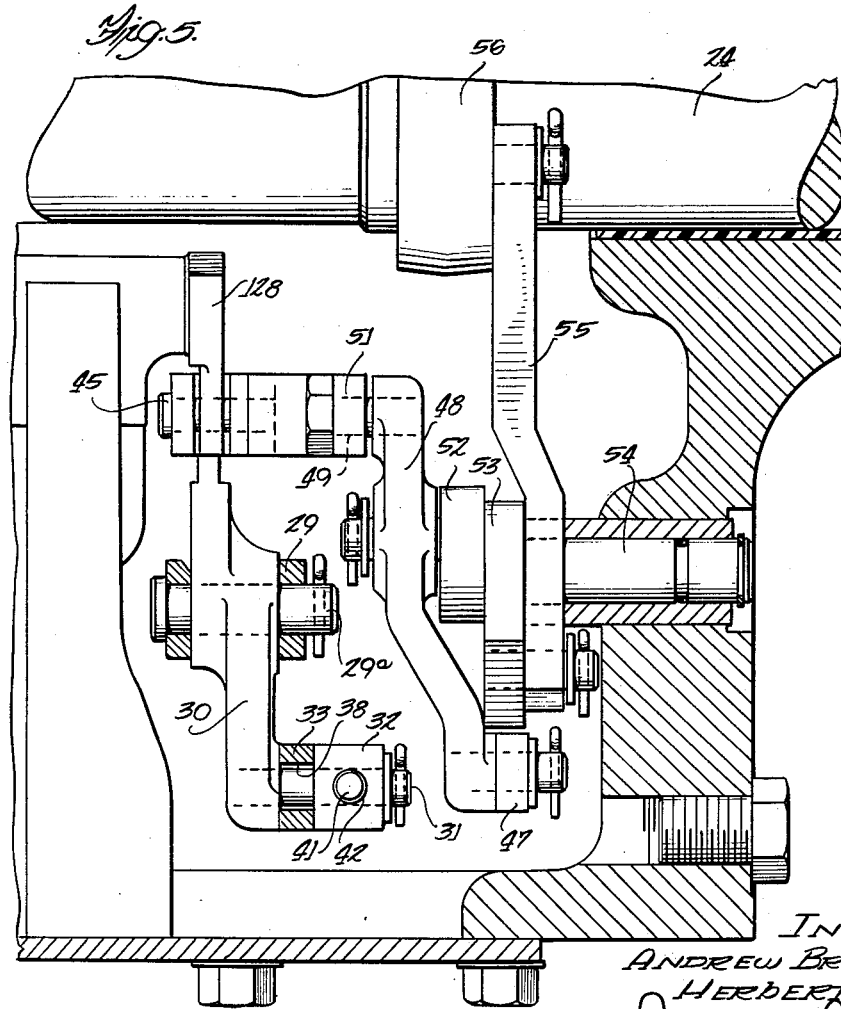
INVENTORS
ANDREW BRUDNAK, JR.
HERBERT G. AKINS
ATTORNEY

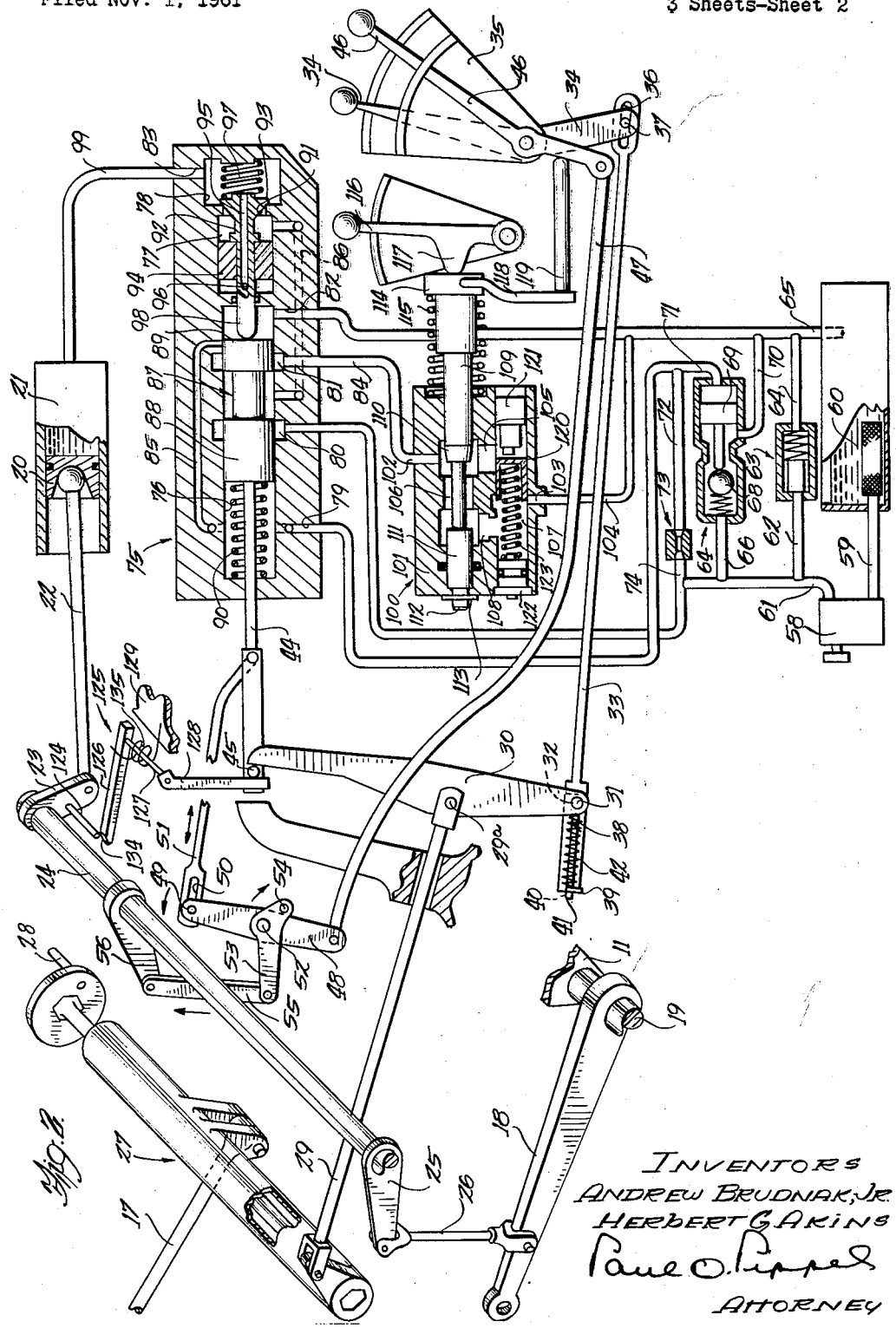

May 12, 1964  A. BRUDNAK, JR., ETAL  3,132,699
SAFETY RELEASE AND SWITCH OUT MECHANISM FOR HYDRAULIC SYSTEM
Filed Nov. 1, 1961  3 Sheets-Sheet 3

INVENTORS
ANDREW BRUDNAK, JR.
HERBERT G. AKINS

ATTORNEY

United States Patent Office 3,132,699
Patented May 12, 1964

3,132,699
SAFETY RELEASE AND SWITCH OUT MECHA-
NISM FOR HYDRAULIC SYSTEM
Andrew Brudnak, Jr., Oak Lawn, and Herbert G. Akins,
Westmont, Ill., assignors to International Harvester
Company, Chicago, Ill., a corporation of New Jersey
Filed Nov. 1, 1961, Ser. No. 149,367
5 Claims. (Cl. 172—9)

This invention relates generally to tractors and more particularly to improvements in the control of tractors equipped with hydraulic power-operating means for raising and lowering implements attached to the tractor. More specifically, however, the invention is directed to safety release means for preventing accidental damage to the hydraulic system and the associated control linkage because of human error in operating the controls thereof.

It is old and well known, of course, to provide hydraulic lift systems for controlling the raising and lowering of attached implements on tractor vehicles, and to provide in the controls thereof a mechanism that operates to provide a position control of the implement and a mechanism to provide draft control. The present invention concerns itself mostly with the mechanism used to provide draft control, but since the draft control and position control mechanisms are, preferably, interrelated and usually actuate a common hydraulic control valve the invention is, of course, related to both such mechanisms. Usually in such control systems the position control mechanism is arranged so that when the tractor-coupled implement has been raised or lowered to a desired position suitably associated followup means functions to automatically move the hydraulic control valve back to neutral and thus stop further movement of the implement. Likewise, when the implement is raised to its maximum height or to its transport position the followup means automatically operates to return the control valve to neutral and thus prevents damage to the system that might otherwise result from a buildup of pressure therein unless the control valve is actuated when maximum height had been attained.

Ordinarily, when the draft control mechanism in such systems incorporates two-way sensing therein such mechanism is not used to effect the raising of an attached implement to the transport position, but instead the operator usually shifts his control action to the position control mechanism for the purpose thus necessitating going from one hand control lever to the other to accomplish the different operations. It is possible with some of the implement control systems presently on the market to raise the implement to transport position by operating the two-way sensing draft control mechanism, but this is not always desirable because in order to do so the operator has to closely observe the movement of the implement then manually shut off the flow of hydraulic pressure at the proper moment when the implement has attained transport position which generally corresponds with maximum elevation of the implement. Heretofore, however, no safety feature or tripout release has ever been provided that would permit this feature of operation with the two-way sensing type draft control mechanism without the possibility of encountering damage if the operator's reactions were slow or his attention was temporarily diverted elsewhere while so utilizing the system. It was with these particular difficulties in mind that the present invention was conceived and developed.

It is a primary object, therefore, of the present invention to provide, in a tractor hydraulic power-lift system adapted for raising and lowering an implement attached to the tractor, means for preventing an excessive buildup of pressure such as might result in damage to the hydraulic system as a result of raising the attached implement to its transport position by manual manipulation of the draft control mechanism portion of said power-lift system.

Another object is to provide means for actuating the control valve and returning said valve to a neutral condition whereby flow of fluid in a tractor hydraulic power-lift system is stopped when an attached implement has been raised to transport position attendant operation of the draft control mechanism portion of said system.

A further object is to provide, in a tractor hydraulic power-lift system that is selectively operative under a two-way sensing type of draft control mechanism or under a position control mechanism for raising and lowering an attached implement, means for interrupting the raising operation when the implement has been raised to its transport position as a result of operation of the draft control portion of said system.

A still further object is to provide, in a tractor hydraulic power-lift system that is selectively operative under a draft control mechanism or under a position control mechanism for raising and lowering an attached implement, tripout or release means, operative responsive to a predetermined rotated position of the power-lift rockshaft corresponding to the maximum elevated position of an attached implement, for actuating the control valve of the hydraulic system and returning said valve to its neutral position when said power-lift system is actuated responsive to manipulation of the draft-control mechanism thereof.

A yet still further object is to provide, in a tractor hydraulic power-lift system that is selectively operative under draft control mechanism or under position control mechanism for raising and lowering an attached earthworking implement, valve actuating means responsive to a maximum elevated position of the attached implement for restoring the control valve of said system from an implement-raising position to a neutral position wherein upward movement of the implement is stopped when said power-lift system is actuated responsive to manipulation of the draft control mechanism thereof.

Further objects and advantages of the invention will become apparent as the following description proceeds, and the features of novelty which characterize the invention will be pointed out with particularity in the claims annexed to and forming a part of this specification. For a better understanding of the invention, reference may be had to the accompanying sheets of drawings, in which:

FIGURE 1 is a side-elevational view of a tractor embodying the present invention and having an implement in the form of a plow attached thereto, the near, rear wheel being removed to better show the hitch;

FIGURE 2 is a diagrammatic representation of the hitch linkage, associated controls and hydraulic system and having portions thereof shown in section;

FIGURE 5 is a fragmentary end-elevational view in slightly enlarged dimensions, with portions thereof in section, of the portions of the invention shown in the two preceding figures.

Figure 3:
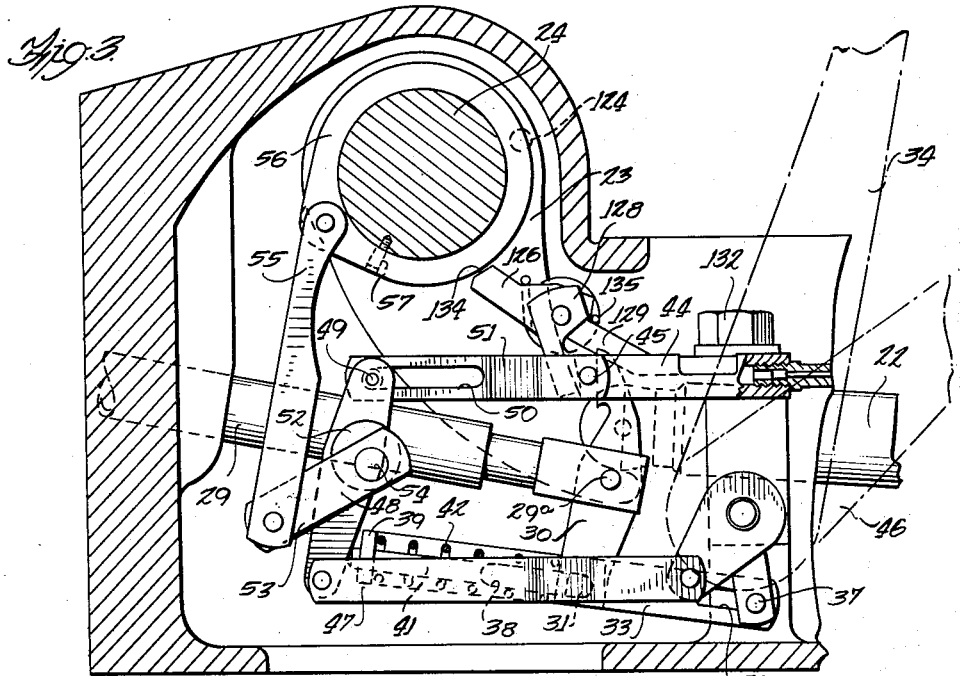
FIGURE 3 is a fragmentary view showing in semi-diagrammatical side elevation, with portions thereof in section, the control linkage of the invention and shown in a neutral position.

Referring now more particularly to the drawings where there is depicted a preferred embodiment of the invention, it will be noted a tractor vehicle is indicated generally by the reference numeral 10 while a rear portion of the frame thereof is shown at 11, and the engine at 12, with the front and rear wheels being shown, respectively, at 13 and 14. The attached implement used for illustrative purposes herein is a plow 15 that may include an A-frame 16 and is coupled or connected to the tractor by pivotally mounted hitch linkage such as the upper and lower links 17 and 18, respectively. As is understood, the lower links 18, frequently termed draft links, usually include a pair of laterally spaced-apart members (only one such link being illustrated herein) that are pivotally attached to the tractor frame as indicated at 19. It will be appreciated, also, that other implements may, of course, be attached to the hitch links either directly or by means of a conventional drawbar supported between the rearward ends of said lower links, all as is well understood in the art.

A piston 20 reciprocates within a cylinder 21, suitably carried by the tractor frame 11, and is connected by means of a connecting rod 22 to a crank arm 23 mounted upon and constrained for rotation with a rockshaft 24, in turn, suitably journaled by the tractor frame. A pair of laterally spaced-apart lift arms 25 are mounted upon the rockshaft 24 for rotation therewith and are connected by drop or lift links such as 26 to the lower draft links 18 (only one of each of which elements is shown). The upper or third link 17 is pivotally connected at its forward or vehicle end to a torsion spring assembly 27 which, in turn, is supportably carried by the tractor frame 11 and a portion thereof is anchored as indicated by the dowel pin at 28 thereto. Since the torsion spring assembly 27, preferably, is of the type described in copending U.S. application Serial No. 76,903 filed December 19, 1960, it was felt a further elaboration of the details of its construction and operation in this application was unnecessary. Suffice it to say that said torsion spring assembly also has pivotally connected to it a member 29 operative to translate the induced motion of the assembly by a connection at its opposite end to draft control linkage mechanism as will hereinafter be described.

Figure 4:
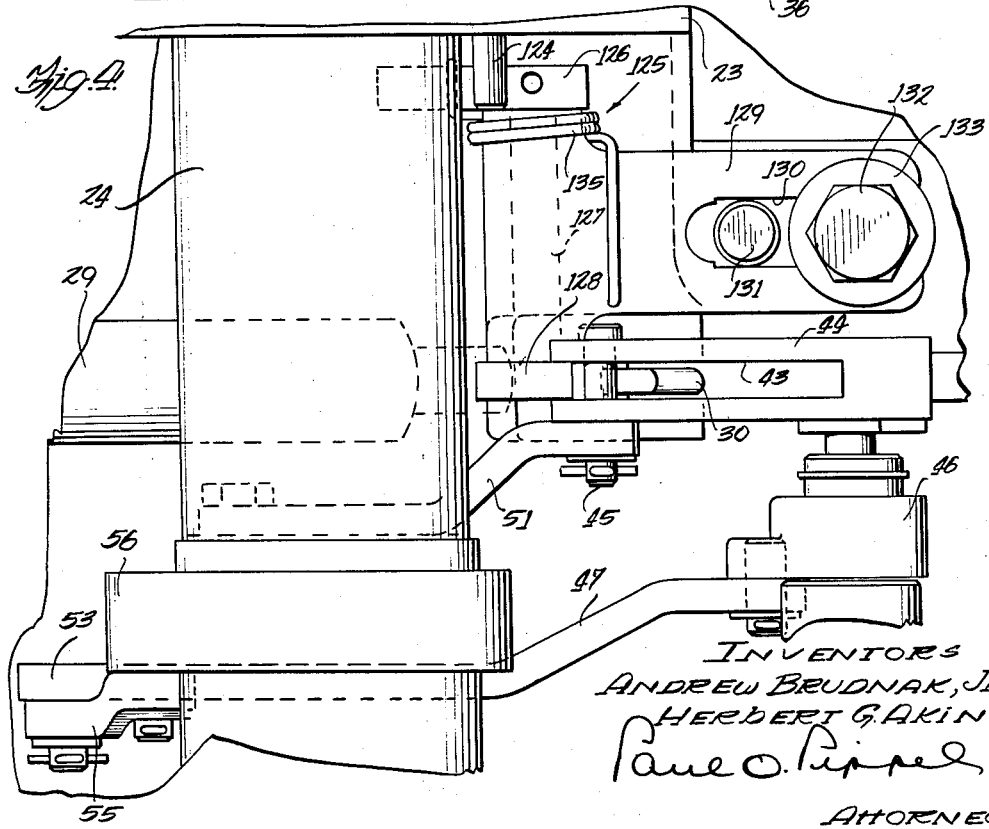
FIGURE 4 is a fragmentary plan view in slightly enlarged dimensions, with portions thereof in section, of the portions of the invention shown in the preceding figure.

The member 29, frequently termed a draft-responsive member has its opposite end pivotally connected at 29a to a draft control link 30 intermediate the ends thereof. One end of link 30 is pivotally connected by a pin 31 and an abutment or anchoring block 32 in slidable relation to a force-transmitting member 33 the opposite end of which latter member is slidably connected to a manually actuated draft control lever 34 that, in turn, is pivotally mounted by suitably friction means (not shown) adjacent a sector quadrant 35 and all are supportably carried by the tractor frame 11. The member 33 is fashioned with a longitudinally extending slot-like opening 36 at the forward end thereof that slidably receives a pin 37 securedly mounted in the end of control lever 34, while a second longitudinally extending slot-like opening 38 proximate the rearward end of said member slidably accommodates the draft link pin 31, and the opposite end of said force-transmitting member may be overturned as shown at 39 and fashioned with an opening 40 therethrough. A rod 41 has one end thereof threadably anchored in abutment block 32 while the opposite or free end of the rod is slidably accommodated in opening 40 in the overturned end 39 of member 33. A coil spring 42 circumscribing rod 41 is positioned between the overturned end 39 and abutment block 32 and disposed so as to constantly urge the pin 31 against the end of slot 38 in member 33. The assembly whereby member 33 is connected to link 30 may be termed resilient connection means for reference purposes. The opposite end of draft control link 30 extends into a slotted recess 43, fashioned in one end of a valve actuating member 44 (FIGURE 4), and is disposed to contactingly engage a portion of pin 45 mounted in said actuating member proximate one end thereof and is arranged so that movement of said link 30 in one direction will carry said valve actuating member therewith.

A manually operated position control lever 46 is suitably mounted by friction means (not shown), adjacent the draft control lever 34 and sector quadrant 35, and is, likewise, supportably carried by the tractor frame 11. The free end of control lever 46 is pivotally connected to one end of a connecting link 47 while the opposite end of said link is pivotally connected to a lever 48 whose opposite end has a pin 49 mounted therein, and which pin is slidably accommodated in a slot 50 in one end of a link 51, and the opposite end of said latter link is pivotally connected to the valve actuating member 44. Intermediate its ends the lever 48 is pivotally connected as shown at 52 to a crank member 53 which, in turn, is pivotally mounted at 54 on the frame 11, and at its opposite end the crank is pivotally connected by a link 55 to a collar-like crank 56 that is mounted on the rockshaft 24 and constrained for rotation therewith by suitable securing means such as the set screw indicated at 57 (FIGURE 3). The elements of this position control followup mechanism it will be seen function generally similar to the differential linkage disclosed and described in copending U.S. application Serial No. 56,475 filed September 16, 1960.

A hydraulic pump 58 has the inlet or suction side thereof connected by a conduit 59 with a fluid reservoir 60, while the outlet or discharge side of the pump is connected by conduits 61 and 62 with a conventional safety valve 63 which, in turn, connects by conduits 64 and 65 with said reservoir. The outlet conduit 61 also connects with a conduit 66 which communicates with a regulator valve 67 having a spring-biased ball valve 68 therein and operable by a piston 69. One side of said piston communicates through conduit 70 with the return flow conduit 65 while the opposite side of the piston 69 opens into a conduit 71 which interconnects with a conduit 72 that opens into a small orifice 73, the opposite side of which orifice communicates with conduit 61 by way of a connecting conduit 74.

The main control valve, designated generally by the reference numeral 75, is fashioned to provide coaxially extending chambers 76, 77, and 78, and having port openings 79, 80, 81, 82, and 83 communicating with various ones of said chambers. Conduit 71 connected with one side of regulator valve 67 opens into port 79, while conduit 61 extending from the pump discharge opens into port 80 which, in turn, communicates with chamber 76 intermediate the ends thereof, and port 81 adjacent to and communicative with one end of the latter chamber opens into conduit 84. An interior passage 85 in said main valve extends from port 79 to chamber 76 proximate the area of the opening of port 81 thereinto, and a second interior passage 86 communicates with and extends from chamber 76 at a point intermediate the ports 80 and 81 to the next adjacent chamber 77. A spool 87 of said main valve is connected to and constrained for movement with actuating member 44 and is fashioned to provide two axially spaced-apart lands 88 and 89, with land 88 being slidably movable to control flow through port 80 while land 89 is slidable to control flow through port 81 and the interior passage 85.

The spool 87 is biased toward the drop position of the valve by a spring 90 acting between one end of the spool and a fixed abutment provided by the main valve casing. Conduit 65 which communicates at one end with reservoir 60 communicates at its other end through port 82 with that portion of valve chamber 76 disposed at the axially opposite end from that of the position of spring 90.

A port 91, fashioned in main control valve 75, communicates with adjacent chambers 77 and 78, and a poppet valve 92 therein includes a head portion 93, that seats to close said latter port and extends into chambers 77 and 78, and a piston portion 94 which is slidably engaged by said head portion in chamber 77. Extending axially through poppet valve 92 is a small diameter bleed passage 95 that connects at the inner end thereof with a radially extending passage 96 and these latter passages function to communicate one of said chambers with the other when said poppet valve is seated closed. A spring 97, reacting between said poppet valve head and a fixed abutment provided by the valve casing is disposed in chamber 78 and serves to bias said poppet valve head to a closed position against port 91. Axially inwardly extending from the end of poppet valve 92 is a plunger 98 which projects into chamber 76 and is adaptable for engagement by land 89 of spool valve 87. A conduit 99 extending from port 83 which opens into chamber 78 provides fluid communication with the hydraulic ram cylinder 21.

The drop flow control means, indicated generally at 100, is generally similar to the device disclosed and described in copending U.S. application Serial No. 131,265 filed August 14, 1961, and reference may be had thereto for further details of the construction and operation thereof. The housing 101 thereof is provided with an inlet port 102 that communicates through conduit 84 with port 81 of main valve 75, and an outlet port 103 that communicates by way of conduits 104 and 65 with reservoir 60. Inlet port 102 opens into a passage 105 from which extends first and second intermediate parallel passages 106 and 107, respectively, while a third intermediate passage 108 axially spaced from passage 105 also interconnects said first and second passages. A piston-like flow controller 109 slidably positioned in passage 106 includes a flow-metering plunger portion 110, and an interconnected piston guide portion 111 having an axially extending portion 112 which projects outwardly of said housing and which has a snap ring, such as 113, thereon that contacts said housing and limits movement of said flow controller in one direction, while a flange 114 on the opposite end of said flow controller abuttingly seats a spring 115, the opposite end of which abuts said housing, and yieldably resists movement of the controller in another direction. A drop control hand lever 116 which is suitably pivotally mounted and supportably carried by the frame 11 has a projection 117 thereon that is engageable with flange 114 for slidably positioning the flow controller within passage 106, and affixed to flange 114 is an arm-like extension 118 from the end of which projects a rod 119 that is adapted for engagement with control lever 46. As illustrated herein, the position control lever 46 is in its lowered position whereupon said lever contacts rod 119 and hence further clockwise movement of said control lever will operate to effect a change in position of the said flow controller.

A freely floating position 120 is slidably positioned in passage 107 and a member 121 pressed in one end of said latter passage provides a stop therefor, while an access member 122 is removably positioned in the opposite end of the passage, and a light biasing spring 123 is mounted in the passage between the piston and said access member.

Now, in accordance with a more specific teaching of the present invention, there is provided followup and release means cooperative between the rockshaft crank arm and the draft control and valve mechanisms for tripping out the hydraulic system by returning the control valve thereof to its neutral position when the attached implement has been raised to its maximum elevation or transport position as a result of actuating the power-lift system by manual manipulation of the draft control mechanism. The mechanism for accomplishing this objective includes a pin-like projection 124 transversely mounted in crank arm 23 and constrained to rotate therewith, and a double-armed lever or bellcrank, indicated generally at 125, that is engageable with said pin-like projection and with the main valve actuating member. One arm 126 of said bellcrank is affixed at one end thereof to a connecting shaft 127 and the opposite end of the shaft has affixed thereto a depending arm 128 whose free end is disposed for engagement with a portion of the pin 45 in the actuating member 44. The engagement of arm 128 with said pin is on the opposite side thereof from that engaged by the draft link 30, hence the movement of actuating member 44 by arm 128 is normally opposed by draft link 30. The shaft 127 is journaled in a support bracket 129 adjustably carried by the vehicle frame 11. The bracket 129, preferably, is fashioned with a slotted recess 130 extending inwardly from one end thereof that is adapted to slidably receive a guide pin 131 anchored in the frame 11 and a holding or anchoring bolt 132 threadable into said frame. An enlarged washer 133 may be provided under the head of the adjustable bolt 132, if desired, to improve the holding facility thereof. The free end of arm 126 of the bellcrank may be provided with a cutoff or chamfered portion 134 to facilitate engagement of said arm with the crank arm pin 124. A coil spring 135 wrapped around the shaft 127 is disposed with one end thereof abutting the top or upper surface of arm 126 while the opposite end of said spring abuts the top or upper surface of the support bracket 129. As thus disposed, the spring 135 slightly biases the bellcrank 125 into closely contacting engagement with the actuating member pin 45 and by so doing maintains the arm 126 of said bellcrank always in position for possible engagement with the crank arm pin 124.

In the present instance and for purposes of ready reference the position control mechanism may be said to include the crank-like collar 56 rotatably carried by rockshaft 24, link 55 connected with said collar, differential crank member 53 pivotally mounted on the frame and connected to link 55, lever 48 pivotally connected intermediate its end to crank 53, link 51 slidably connected at one end thereof through pin 49 and slot 50 to lever 48 and at its opposite end to valve actuating member 44, connecting link 47 and control lever 46 connected to lever 48 by means of link 47. In like manner, the draft control mechanism may be said to include spring assembly 27, draft responsive member 29, draft link 30 pivotally connected intermediate its ends to member 29 and one end of which engages the pin 45 in valve actuating member 44, pin 31, block 32, rod 41, spring 42, force-transmitting member 33, and control lever 34 slidably connected by the pin 37 and slot 36 to member 33 which, in turn, is yieldably connected to draft link 30 by way of the spring 42 and its associated elements. The power-actuated lift mechanism may be said to include lift links 26, lift arms 25, rockshaft 24, crank arm 23, connecting rod 22, piston 20, cylinder 21, valve actuating member 44, and control valve 75.

*Operation*

In operating the above system, when the main control valve 75 is in its neutral position, as shown in the attached schematic representation, fluid pressure from pump 58 dicharging through conduits 61 and 74, orifice 73, and conduits 72 and 71 into one side of regulator valve 67 causes piston 69 to be moved to the left and ball valve 68 to be unseated, after which the main flow of fluid from pump 58 is bypassed through said regulator valve and back to reervoir 60. Attendant this action poppet valve head 93 remains seated under the combined influence of spring 97 and fluid pressure in chamber 78, thus fluid remains locked in ram cylinder 21.

In order to raise or lift an attached implement to a newly selected position the position control lever 46 is manually moved counterclockwise to a position corresponding with said desired implement position whereupon such motion, acting through the connecting link member 47, lever 48, link 51 and valve actuating member 44, moves the valve 87 leftward against the resistance of spring 90 until land 89 clears the end of passage 85 and thereupon allows fluid from regulator valve 67 to pass through conduit 71, port 79, interior passage 85, chamber 76 and conduit 84 back to reservoir 60. This action relieves pressure against piston 69 and permits ball valve 63 to seat and thus prevent further bypass of fluid through said regulator valve. With the leftward movement of valve 87 the land 88 will clear port 80 and allow fluid pressure from conduit 61 to pass through said latter port, thence chamber 76, interior passage 86 and into chamber 77 to unseat poppet valve 92. Attendant this valve movement fluid pressure forces piston 94 leftward causing the balancing fluid behind said piston to be forced through bleed passages 95 and 96 into chamber 78 and when movement of said latter piston ceases the fluid pressure in said chamber becomes effective to open poppet valve 92 and force the head 93 thereof off its seat. As this occurs, fluid pressure is directed through conduit 99 to act on piston 20 of ram cylinder 21 which, thereupon, acting through connecting rod 22 and crank arm 23, causes rockshaft 24 to rotate and, acting through lift arms 25, links 26 and lower links 18, raises the attached implement. Upon upward movement of the implement the differential followup linkage, generally indicated by the reference numerals 48, 51, 53, 55, and 56, operates to permit the main control valve 75 to move toward its neutral position under the urging of spring 90 and when the attached implement attains the desired height, as predetermined by the setting of position control lever 46, the valve will have been returned to its neutral position.

In order to drop or lower the implement, position control hand lever 46 is moved clockwise, as viewed herein, whereupon connecting link 47 is moved leftward and causes lever 48 to rotate about its pivot 52 and move pin 49 away from the end of slot 50 in member 51. This permits valve spool 87 to move rightward under the urging of spring 90 until land 89 clears port 81, and attendant this movement of valve spool 87 the poppet valve 92 is moved rightward to unseat the head 93 thereof and thus permit fluid from ram cylinder 21 to be discharged through conduit 99, chamber 78, passage 86, conduit 84, the drop flow control 100, and conduits 104 and 65 back to reservoir 60. Fluid is also metered through bleed passage 95 into chamber 77 causing piston 94 to move to the right relative to valve 92 and tending to balance fluid pressure in chamber 78. It is understood, of course, that spring 97 provides a limited force that tends to bias valve 92 leftward. The followup differential linkage, of course, functions to return main control valve 75 to its neutral position when the attached implement has been lowered to a depth corresponding to the setting of the position control lever 46. Since interior passage 85 was closed, upon movement of land 89 to the right, regulator valve 67 is returned to its bypass condition.

The position of draft control lever 34 ordinarily establishes a setting at which an increase or decrease in draft load can be effective for actuating the main control valve 75. During draft control operations position control lever 46 is moved toward the down or lowered position, clockwise as viewed herein. When draft load on the attached implement becomes excessive, a compressive force is created in upper link 17 which, after overcoming the resistance of torsion spring 27, is transmitted as a tension force through the draft responsive member 29. A tension force in said member is operative to pivot draft control link 30 about its lower pivot 31 and then, acting through actuating member 44, to move the main valve plunger leftward to a position such as will permit entrance of fluid into ram cylinder 21 and thus raise the attached implement. Leftward movement of actuating member 44 and its interconnected link 51 by movement of link 30 causes the slotted link 51 to slide about pin 49 without disturbing any previously established setting of the position control mechanism. When the implement has been raised sufficient to diminish its excessive draft load the compressive force created in upper link 17 is reduced so that torsion spring assembly 27 is able to force member 29 rightward, whereupon main control valve 75 is returned by spring 90 to its neutral position. If, at this point, the draft load on the implement is less than that for which the hand lever 34 is set the member 29 will continue to move rightward thus permitting spring 90 to move main control valve 75 further rightward sufficiently to uncover port 81 while also opening poppet valve 92 to release fluid from cylinder 21 following which the implement is lowered to accommodate a draft load corresponding to the position setting of control lever 34, thereafter when the force in upper link 17 is increased member 29 is again moved leftward and the main control valve is returned to its neutral position.

When the relationship between draft load, implement weight, and torsion spring reaction is such that a tension force is created in upper link 17, automatic draft control is achieved in the same manner by positioning the control lever 34 at a selected point nearer the upper end of its range. Member 29 and spring 90 will then cooperate to move the main control valve 75 leftward or rightward so as to effect admission or release of fluid to or from cylinder 21, as previously described, so that a balanced relationship is maintained.

When it is desired to raise the implement to transport position, by operating the draft control rather than the position control mechanism, the control lever 34 is rotated counterclockwise or toward the "up" position whereupon member 33 is moved rightward and carries with it draft control link 30 which thereupon rotates about pivot 29a and the opposite end of said link then engages pin 45 and moves the valve 75 leftward to an implement raising position after which fluid enters cylinder 21 and causes the implement to be raised. As the implement rises rockshaft 24 rotates clockwise, as viewed herein, and the pin 124 on crank arm 23 attached to said rockshaft rotates into engagement with arm 126 of bellcrank 125. Engagement of said arm by the pin causes counterclockwise rotation of the bellcrank whereupon arm 128 thereof is rotated to force pin 45 and actuating member 44 rightward to return the valve 75 to its neutral position. As arm 128 engages pin 45, it is resisted or opposed by link 30 disposed in contacting engagement with the opposite side of the said pin, whereupon link 30 is forced to rotate about its pivot 29a and, in doing so, compresses spring 42 associated with member 33, which movement of link 30 thereafter permits the rightward movement of pin 45 and main control valve 75. In this manner, the operator is able to utilize the draft control mechanism for raising the implement to transport position without fear of overrunning or accidentally placing the system on high pressure when no further movement of the implement is possible such as when maximum elevation thereof is attained. Thus damage to the equipment is avoided while still permitting the draft control mechanism to be used for raising and lowering the implement at will. Furthermore, with this proposed improvement, it is not necessary to make adjustments of limit stops to compensate for various weights of implements such as is frequently done by way of using movable stops on the sector quadrant. In addition, this improvement serves to prevent the system from going on to intermittent operation because of bouncing on a rough road. The overriding or breakaway spring 42 also serves to prevent the rockshaft from rotating beyond designated limits in the event the draft control lever 34 is not released in time when raising an implement. This improvement, additionally, offers the advantage of permitting a fast lift of the draft control lever when the tractor hits soft soil and thus prevents burying the tractor. It also permits one manually operated control lever to be used for most all lifting and lowering operations, a distinct advantage.

The rate of implement drop is determined, as described in heretofore-noted copending application Serial No. 131,265, by the flow control means indicated generally at 100. Movement of drop control lever 116 or, alternatively, continued movement of position control lever 46 in a clockwise direction beyond the down or lowering position shown in the drawing, will cause said flow controller to slide within passage 106. The portion 110 of the flow controller acts as a variable restriction, regulating communication between port 102 and passage 106 to establish a pressure differential between passages 105 and 106, which differential is a function of the flow through port 102. This pressure differential provides unbalanced forces acting upon floating piston 120 in passage 107. Such unbalanced forces, in conjunction with a predetermined biasing force provided by spring 123, cause said piston to slide within the passage 107 in such manner that communication with outlet port 103 is varied in accordance with the pressure differential. The actual rate of flow from outlet port 103 remains constant notwithstanding variable input pressure, resulting in a constant dropping rate for implements of considerably varying weights. In this connection it will be understood that variations in the temperature or viscosity of the hydraulic fluid will not affect the rate of flow from outlet port 103 because the pressure differential established represents a percentage of the input pressure rather than an absolute difference. With this arrangement overcompensation in draft control operation is substantially eliminated by the flow control means which serves, in effect, to dampen the dropping rate, thus quickly establishing a balanced condition therefor. Furthermore, this arrangement provides for a uniform dropping rate regardless of the weight of a particular attached implement, once a desired rate is established by means of the setting drop control lever 116 or the position control lever 46. This insures that the working element of the attached implement will contact the ground quickly and at a predetermined position when position control lever 46 has been set to effect a dropping thereof.

While only one form of the invention has been shown, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a power-operated system for a tractor-borne draft linkage, the combination with a pressure fluid operated actuator mechanism operative to raise or lower the draft linkage, of valve mechanism shiftable in opposite directions from a neutral position to respectively control the supply of fluid to and exhaust of fluid from said actuator mechanism, a draft-responsive control member adapted to be displaced progressively in proportion to the draft load imposed on the draft linkage, means for shifting said valve mechanism in response to displacement of said control member including a link follower element connected to and movable by said control member and engageable in a one-way connection with said valve mechanism and operative to cause said valve mechanism to supply fluid to said actuator mechanism so as to raise the draft linkage, safety release means including force-transmitting linkage engageable at one end of said latter linkage in a one-way connection with said actuator mechanism and engageable at the other end of said force-transmitting linkage in a one-way connection with said valve mechanism, and having said force-transmitting linkage engageable with said valve mechanism at a point adjacent to but in opposed relationship thereto of the point of engagement of said follower element with said valve mechanism and operative responsive to movement of the draft linkage for shifting said valve mechanism from a position of supplying fluid to said actuator mechanism to the neutral position thereof when the draft linkage rises to its maximum elevation.

2. In a power-operated system for a tractor-borne draft linkage, the combination with a pressure fluid operated actuator means operative to raise or lower the draft linkage and including an element movable with the draft linkage and effective for indicating the vertical elevation of said linkage, of valve mechanism shiftable in opposite directions from a neutral position to respectively control the supply of fluid to and exhaust of fluid from said actuator means, a draft-responsive control member adapted to be displaced progressively in proportion to the draft load imposed on the draft linkage, means for shifting said valve mechanism in response to displacement of said control member including a draft control link fulcrumed intermediate opposite ends thereof on said control member and having one end of said draft control link engageable in a one-way connection with said valve mechanism and being movable by said control member for shifting said valve in a direction to supply fluid to said actuator means, a manually adjustable lever pivotally mounted on the tractor, linkage means operatively interconnecting said manually adjustable lever and the other end of said draft control link including resilient connection means fashioned therein yieldable to permit movement of said draft control link in one direction relative to said linkage means, bellcrank means pivotally mounted on the tractor and having one arm thereof disposed for engagement with said actuator element and another arm thereof disposed for engagement in a one-way connection with said valve mechanism, said bellcrank means being operative responsive to movement of said draft linkage to a maximum height for shifting said valve mechanism against the reaction of said resilient connection means from a position of supplying fluid to said actuator means to a neutral position thereof.

3. In a power-operated system for a tractor-borne draft linkage, the combination with a pressure fluid operated actuator means operative to raise or lower the draft linkage, of valve mechanism shiftable in opposite directions from a neutral position to respectively control the supply of fluid to and exhaust of fluid from said actuator means, said valve mechanism including a member slidable on an axis along which said mechanism is shiftable in opposite directions from a neutral position and having a projecting end and an engageable pin mounted on the member proximate said end and extending transversely thereof, a draft-responsive control member adapted to be displaced progressively in proportion to the draft load imposed on the draft linkage, means for shifting said valve mechanism in response to displacement of said control member including a link fulcrumed intermediate opposite ends thereof on said control member and having one end of said link engageable in a one-way connection with one portion of the perimeter of the pin of said valve member and being movable by said control member for shifting said valve mechanism in a direction for supplying fluid to said actuator means, a manually adjustable lever pivotally mounted on the tractor, linkage means connected between said manually adjustable lever and an opposite end of said link, said linkage means including resilient connection means yieldable to permit movement of said link in a direction such as will permit the said one end of said link to be moved when said link is pivoted about its fulcrum connection with said control member, bellcrank means pivotally mounted on the tractor and having one arm thereof engageable with said actuator means and another arm thereof engageable in a one-way connection with a portion of the perimeter of the pin of said valve member opposite that portion of the pin engaged by said link, said bellcrank means being operative responsive to movement of said draft linkage to a maximum elevation for shifting said valve mechanism against the reaction of said resilient connection means from a position wherein fluid is being supplied to said actuator means to a neutral position thereof.

4. In a power-operated system for a tractor-borne draft linkage, the combination with a pressure fluid operated actuator means operative to raise or lower the draft linkage, of valve mechanism shiftable in opposite directions from a neutral position to respectively control the supply of fluid to and exhaust of fluid from said actuator means, draft-responsive control means adapted to be displaced progressively in proportion to the draft load imposed on the draft linkage and including two-way acting resilient means and a control member with said resilient means being operatively disposed between and connected to said draft linkage and to one end of said control member, means for shifting said valve mechanism in response to displacement of said control means including a draft control link fulcrumed intermediate opposite ends thereof on the end of said control member opposite that to which said resilient means is connected and having one end of said draft control link disposed for engagement in a one-way connection with said valve mechanism so that upon movement of said draft control link in one direction said valve mechanism is shiftable in a direction to cause fluid to be supplied to said actuator means, a manually adjustable lever pivotally mounted on the tractor, linkage means operatively interconnecting said manually adjustable lever and the other end of said draft control link including resilient connection means fashioned therein yieldable to permit movement of said draft control link relative to said linkage means without disturbing any established setting of said manually adjustable lever, said actuator means being fashioned with an element movable with the draft linkage and being effective to indicate the elevation of said latter linkage, double-armed linkage means pivotally mounted on the tractor and having one arm disposed for engagement with said actuator element and the other arm thereof disposed for engagement with said valve mechanism, said double-armed linkage means being operative responsive to movement of said draft linkage to a maximum elevation for shifting said valve mechanism against the reaction of said resilient connection means from a position of supplying fluid to said actuator means to a neutral position of the valve mechanism.

5. The structure described in claim 4 and further characterized in that yieldable biasing means extending between one arm of said double-armed linkage means and the tractor is disposed to constantly urge the other arm of said double-armed linkage means into engagement with said valve mechanism.

References Cited in the file of this patent

UNITED STATES PATENTS

| | | |
|---|---|---|
| 2,722,873 | Garmager | Nov. 8, 1955 |
| 2,786,402 | Senkowski et al. | Mar. 26, 1957 |
| 2,804,814 | Czarnocki | Sept. 3, 1957 |
| 2,964,113 | Presnell et al. | Dec. 13, 1960 |
| 2,996,124 | Bunting | Aug. 15, 1961 |
| 2,996,125 | Bunting | Aug. 15, 1961 |
| 3,002,571 | Kersey et al. | Oct. 3, 1961 |
| 3,014,536 | Marindin et al. | Dec. 26, 1961 |

FOREIGN PATENTS

| | | |
|---|---|---|
| 68,349 | France | Nov. 4, 1957 |